US007500764B2

(12) United States Patent
Gordin

(10) Patent No.: US 7,500,764 B2
(45) Date of Patent: Mar. 10, 2009

(54) METHOD, APPARATUS, AND SYSTEM OF AIMING LIGHTING FIXTURES

(75) Inventor: Myron K. Gordin, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 273 days.

(21) Appl. No.: 11/406,591

(22) Filed: Apr. 19, 2006

(65) Prior Publication Data

US 2006/0245189 A1 Nov. 2, 2006

Related U.S. Application Data

(60) Provisional application No. 60/672,758, filed on Apr. 19, 2005.

(51) Int. Cl.
*G02B 27/20* (2006.01)
*F21V 21/26* (2006.01)

(52) U.S. Cl. ....................... 362/259; 362/269; 362/414; 362/431

(58) Field of Classification Search ................. 362/259, 362/153, 269, 272, 275, 276, 286, 287, 386, 362/414, 427, 428, 431
See application file for complete search history.

(56) References Cited

U.S. PATENT DOCUMENTS

| | | | | |
|---|---|---|---|---|
| 4,527,198 | A * | 7/1985 | Callahan | 362/285 |
| 5,398,478 | A | 3/1995 | Gordin | |
| 5,600,537 | A | 2/1997 | Gordin | |
| 5,685,636 | A * | 11/1997 | German | 362/259 |
| 6,016,389 | A * | 1/2000 | Crookham et al. | 703/1 |
| 6,340,790 | B1 | 1/2002 | Gordin | |
| 6,398,392 | B2 | 6/2002 | Gordin | |
| 6,709,135 | B2 * | 3/2004 | Couillaud et al. | 362/465 |
| 2006/0139659 | A1 * | 6/2006 | Steinberg | 356/614 |

* cited by examiner

*Primary Examiner*—Bao Q Truong
(74) *Attorney, Agent, or Firm*—McKee, Voorhees & Sease, P.L.C.

(57) ABSTRACT

An apparatus, method, and system of aiming lighting fixtures. One aspect of the invention mounts a substantially collimated light source on a lighting fixture. The direction of the substantially collimated light source is fixed in a known relationship to the aiming direction of the lighting fixture. By finding the substantially collimated light source either by direct viewing or in a mirror, the aiming direction of the lighting fixture can be derived by using the known the relationship between the substantially collimated light source and the aiming direction of the fixture. Thus, the aiming direction of the fixture can be derived without operating the lighting fixture and can be derived even at relatively remote locations from the lighting fixture. The apparatus and method can be used on one fixture or a plurality of fixtures. It can also be used on one fixture of an array of fixtures to aim the entire array.

20 Claims, 15 Drawing Sheets

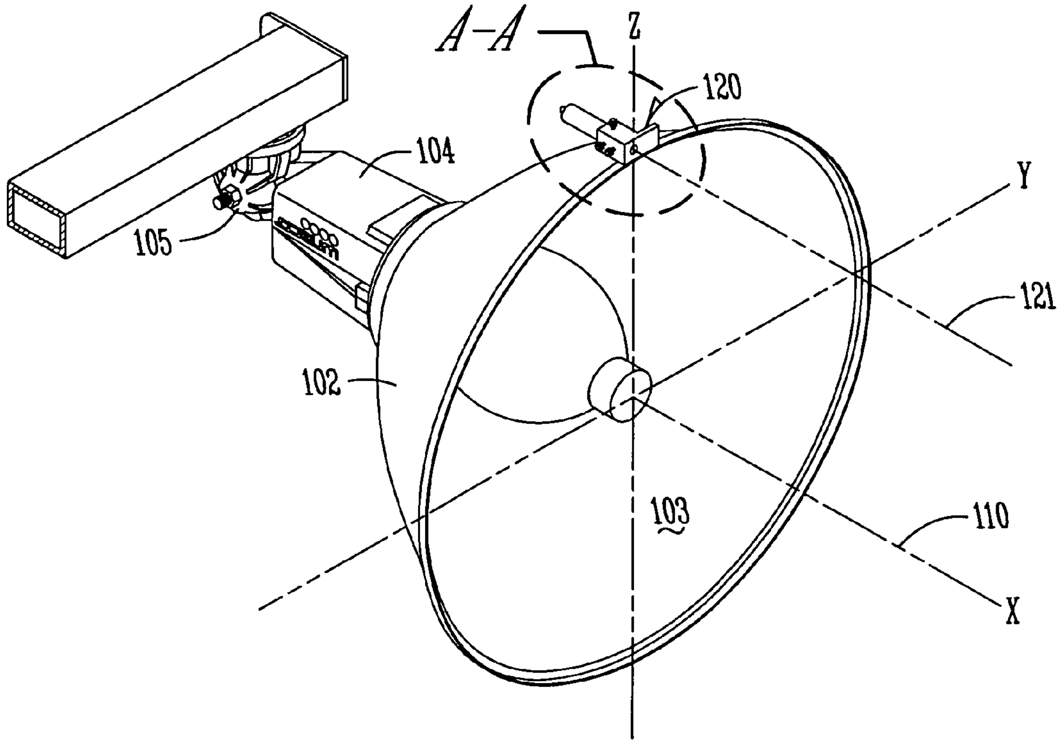
Fig. 4A
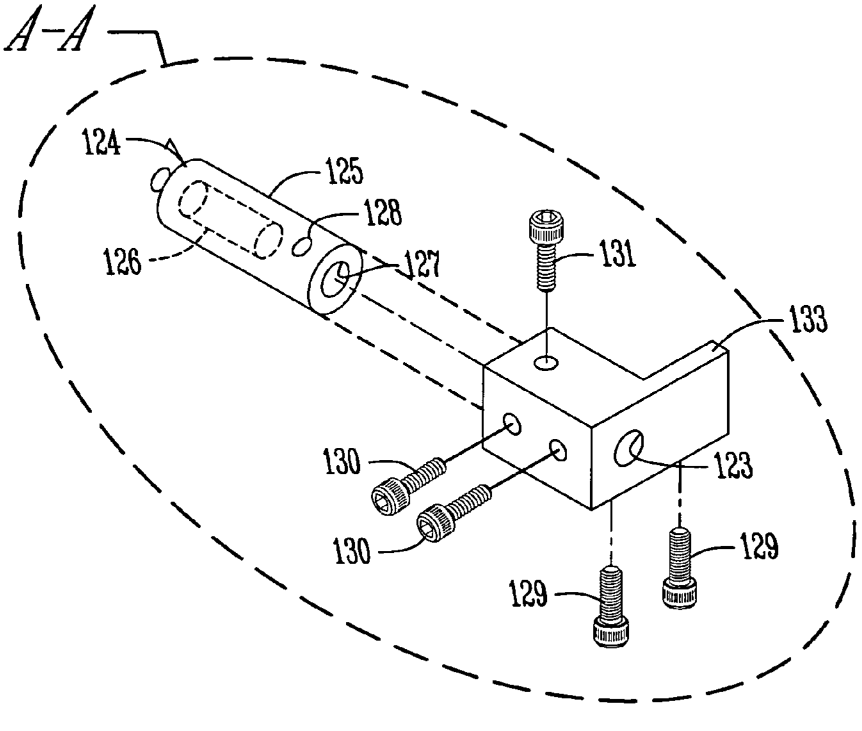

METHOD, APPARATUS, AND SYSTEM OF AIMING LIGHTING FIXTURES

CROSS-REFERENCE TO RELATED APPLICATIONS

This application claims priority under 35 U.S.C. § 119 of a provisional application U.S. Ser. No. 60/672,758 filed Apr. 19, 2005, which application is hereby incorporated by reference in its entirety.

I. BACKGROUND OF THE INVENTION

A. Field of the Invention

The present invention relates to a method, apparatus, and system of aiming lighting fixtures, and in particular, to aiming lighting fixtures that have an optical system that produces a controlled, concentrated beam, for example, the type useful for sports lighting or large area lighting with a plurality of fixtures aimed at different directions to the target.

B. Problems in the Art

In lighting applications that use a plurality of controlled concentrated beams at different positions and angles relative to the target, it is possible to minimize the number of fixtures needed to accomplish the lighting task. As is well known in the art, by empirical methods or computer programs, a design can be created that calls for the number of fixtures, the beam widths and characteristics, and other parameters for given fixture locations. The plan includes aiming points for each fixture—where each fixture should be aimed to a specific point on the target area.

Sports lighting is an example of such an application. Arrays of multiple fixtures are elevated on poles at different locations around the field. Many times specifications direct the minimum light intensity and uniformity levels for the field, and above the field. If appropriately designed, the number of fixtures needed to adequately illuminate the field can be minimized. This can minimize cost of the system.

FIGS. 1A-F shows diagrams which exemplify these types of fixtures and lighting systems. As indicated in FIG. 1A, a plurality of poles A1, A2, B1, B2, each with a plurality of lighting fixtures 101, are spaced around field 100. Typically, fixtures 101 comprise a bowl-shaped reflector 102 with a glass lens 103 over its front open side. Its rear side is mounted to a bulb cone 104 which in turn is connected to an adjustable mounting knuckle 105. Mounting knuckle 105 is connected an adjustable mounting knuckle 105 Mounting knuckle 105 is connected to cross arm 106. The adjustable mounting knuckle 105 allows for different aiming orientations of reflector 102.

FIGS. 2A-C illustrate a similar lighting system but for a different athletic field 100. Here there are 8 poles, identified as A1, A2, B1, B2, C1, C2, D1, and D2. Thirty-eight fixtures are distributed in arrays on each pole (see numbers 1, 2, 3, . . . and FIG. 2A). FIG. 2B is an example of what can be called an aiming diagram for each of those thirty-eight fixtures. It illustrates how a design or plan for the lighting system for that field 100 includes locations and heights of the eight poles and which pole each of the thirty-eight total fixtures will be mounted, as well as where each of fixtures 1-38 are to be aimed to different points on the field (see circled numbers 1-38 in FIG. 2B). FIG. 2B also indicates the type of beam produced from each fixture, the height above the ground, and other information pertinent to the design of the system. As is well known in the art, the aiming points (the circled numbers on field 100 in FIG. 2) are along a line between its corresponding fixture and a point on field 100. That line could be the optical axis of the fixture. Or, it could be what would be considered the center or most intense central point of the beam. In any event, the aiming point on the field is indicative of direction in free space that the fixture and its beam should be aimed and intersect with the field.

Line 170 in FIG. 2C illustrates diagrammatically the line between the fixture 101 and its aiming point on the field (basically in the center of the beam). Even though these beams are controlled and concentrated, they tend to disperse over distance. FIG. 2C shows diagrammatically the outer limits, in a vertical plane, of such a beam (see dashed lines indicating top 171 and bottom 172 of beam). It is to be understood that the center of the beam along axis 170 is most intense whereas the outer edges are much less intense.

The challenge in designing a lighting system with a minimum amount of fixtures is to meet uniformity and intensity minimums across the field. There cannot be any gaps in lighting or substantial unevenness of lighting. To accomplish this, the designs call for precise aiming of the fixtures to their designed locations. It is one thing to design the aiming locations. It is another thing to build and install it accurately. How well the design is implemented depends in large part on how close to the designed aiming points the fixtures actually end up when installed. Correct free space aiming of each fixture is not trivial. The fixtures can be fifty, one hundred, or more feet in the air, and poles can be tens of yards, or more, away from the aiming points. It is easy to find the designed aiming points on the field by using the field map or diagram generated from the design. One simply can measure and stake the physical locations of the aiming points on the two-dimensional field by reference to the map or diagram, such as FIG. 2B. But whether the fixtures are correctly aimed to those points cannot be reliably checked by just using the human eye.

Again, aiming diagrams such as FIG. 2B tell what optic systems are used for each fixture on each pole and the physical location of aiming points on the field for each fixture (e.g., where the center of the beam or optical axis of each fixture intersects with the field). The issue is how does one ensure, with accuracy, that the fixtures, once elevated on the pole, are aimed to their aiming locations.

It is not practical or even reasonably feasible to temporarily erect the fixtures, turn them on, and with the human eye see if the aiming axis intersects at the aiming point on the field. As is well known in the art, these beams are not pinpoint beams. They illuminate many square yards of the field. There is no precise center of the beam that could be identified within the needed accuracy. Furthermore, it would be difficult to even identify beam locations on a field in bright daylight. It would even be improbable that it could be done at nighttime. It would involve just a guess as to what the true beam aiming axis is by looking at a beam's projection on the field.

Therefore, a variety of methods have been attempted to deal with this issue. Musco Corporation of Oskaloosa, Iowa has improved upon sports lighting aiming in the following ways. See, e.g., U.S. Pat. Nos. 5,398,478; 5,600,537; 6,340,790; and 6,398,392. These patents describe and illustrate systems that help the contractor install poles that are plumb and are incorporated by reference herein. A base 109 has (FIG. 2C) has one end firmly in the ground in a plumb position and an upper end extending several feet above the ground. A tubular metal pole simply slip fits over the above-ground base. By careful manufacturing processes, if the pole is straight and the base is plumb, the top of the pole will be plumb. Furthermore, some of these patents have what is called a pole fitter (see reference number 107 in FIGS. 1D-F herein) that slip fits at the top of tubular metal pole section 108 (see FIGS. 1D-F and the incorporated-by-reference U.S. Patents for further details). Musco Corporation markets these types of systems under the trademark LIGHT STRUCTURE™. The pole fitter has pre-attached cross arms 106 that are carefully manufactured. The pole fitter therefore would also be plumb and the cross arms be perpendicular to pole fitter 107 and pole 108. Therefore, when designing the lighting system, the precise position of each fixture 101 relative to field 100, and aiming points on field 100, is known because of the precise relationships of base, pole, pole fitter and cross arms.

This still requires that the aiming axes of each fixture be correctly oriented to its corresponding aiming point on the field. Musco Corporation has developed a system of mounting knuckles 105 that allows the precise pan and tilt relationships of each fixture to its designed aiming point to be preset at the factory. The structure even allows shipment of pole fitter 107 with fixtures 101 attached but hanging straight down and then the installer just moves each fixture to an indicated orientation at the site of the field on the ground. Each fixture is then aimed according to the previously developed design (e.g., FIG. 2B) relative to its cross arm and pole fitter. The pole fitter is then mounted to pole 108 at ground level and then the combination of pole 108, pole fitter 107 (with its cross arms 106) and all of the pre-aimed fixtures 101 is lifted and set down on top of base 109. The advantage is that final aiming of all the fixtures on a single pole should then require only that the pole be rotated (if needed) to a position where the aiming axes 110 of the fixtures should go to the designed aiming locations on the field.

While this has greatly simplified and made more efficient the erection of these types of lighting systems, the final step still is troublesome. How does one ensure that at least one of the fixtures aiming axis 110 (FIG. 3) is accurately aimed to its aiming point?

One way that has been tried is to have a worker stand at an aiming point on the field relative to a pole and, with binoculars, look into the interior of the fixture. If it appears that some structure inside the fixture is in appropriate alignment with the line of sight of the worker through the binoculars, it is assumed that fixture is correctly aimed and thus all fixtures on that pole correctly aimed. However, it has been found to be difficult to get very accurate. Even experienced workers may not get closer than within 5-10 feet of accuracy. Furthermore, some fixtures are harder than others to practice this method. Some glass lenses do not allow a clear view into the interior. There could be reflections or lighting conditions that make it difficult. It has to happen without the fixture's light source on for a view to be made of parts inside the fixture.

Another method places some indicia (e.g., a colored ring of several inches diameter) on the lens of the fixture in direct concentric alignment with the aiming axis of the fixture. The worker stands at the aiming location with binoculars and checks if that circle lines up concentrically with structure in the fixture, such as the end of the bulb or the back of the reflector at its apex. This has the same issues as the previously discussed method. Although it may sometimes be easier to see the ring on the lens, it has proven to be difficult to get needed accuracy on determining, within needed accuracy, whether the fixture is correctly aimed.

Another issue exists. Current methods tend to require one person on the field checking for aiming angles of fixtures and at least one worker at the pole with machinery capable of rotating the pole or adjusting individual fixtures or crossarms in response to instructions of the worker on the field. There is a need in the art for improvement in the amount of time and labor needed to get final aiming of the fixtures and arrays of fixtures.

II. SUMMARY OF THE INVENTION

It is therefore a principle object, feature, advantage or aspect of the present invention to provide an apparatus, method, or system of aiming light fixtures which improves over or solves problems or deficiencies in the art.

Other objects, features, advantages or aspects of the present invention include an apparatus, method, or system which:

a. improves accuracy of aiming light fixtures.

b. improves accuracy of aiming lighting fixtures to within an acceptable accuracy range.

c. can be utilized during almost any environmental condition, daytime, nighttime, indoors, outdoors, etc.

d. promotes better accuracy of aiming and thus promotes better adherence to lighting designs and specifications.

e. promotes better aiming accuracy and promotes better use of light including more light on the field, less spill and glare light off the field, and better uniformity and intensity on the field.

f. provides for efficient aiming in terms of time, labor, and resources.

g. is easy to learn and implement.

h. is economical and practical.

These and other objects, features, advantages, and aspects of the present invention will become more apparent with reference to the accompanying specification.

In one aspect of the invention, a collimated or pseudo-collimated light source is mounted to a fixture in an orientation such that the central beam axis of the collimated source is in a known relationship to the optical axis of the light fixture, for example, parallel and at or near the vertical plane through the optical axis of the fixture. The collimated light source is turned on when the fixture is preliminarily installed and aimed to an aiming point at the target area. A worker either is positioned at or near the aiming point on the field and moves until one worker walks into the beam axis of the collimated light source and the worker perceives a "flash" or substantial increased perception of light intensity from the light source. The worker then has derived the aiming direction of the fixture and can instruct or cause adjustment of the aiming axis of the fixture, if needed, to more accurately project to the aiming point at the target.

In another aspect of the invention, the collimated or pseudo-collimated light source is modified so that it is spread within a plane. The plane of light is projected onto the field and then the worker only has to pass into the plane of light to see the "flash" and know alignment of the fixture.

In another aspect of the invention, a mirror or reflective surface is placed at or near the aiming point at the target. The worker is at a different position. The mirror is adjusted or has the capability of allowing the worker at the different position to have a direct view of the light fixture in the collimated light source. The mirror is moved until the worker perceives the "flash" indicating the central collimated beam axis location. The worker then has derived the aiming orientation of the fixture and can adjust it if needed.

In another aspect of the invention, a reflective surface, or plurality of reflective surfaces extending in at least one direction, is placed with generally its center at the aiming point. The worker either moves relative to a single reflective surface until the "flash" is perceived or, if multiple reflective surfaces, determines which one creates the perceived "flash". In either event, this allows the worker to determine whether the aiming axis of the collimated beam, and thus the fixture, is accurate at the aiming point or offset from the aiming point. Additionally, it allows the worker to determine how much offset exists, at least in that one direction. Adjustment of the aiming direction of the fixture can then be made to bring its aiming axis more accurately to the aiming point.

In a still further aspect of the present invention, the aiming method is used in combination with structure for elevating the lighting fixture, or an array of lighting fixtures, relative to the aiming point. Specifically, the method utilizes steps such that a fixture is factory pre-aimed relative to a mounting structure that, when installed on a pole, has a known relationship to the aiming point in all but one plane. By either direct view of the collimated light source from one fixture on the array, or using a mirror or plurality of mirrors extending along an axis parallel to the plane in which final aiming is required, simply one fixture is aimed according to the method, and then the whole array is considered aligned.

In a still further aspect of the present invention, reflective surfaces elongated in two directions can be utilized according to the method to improve accuracy of aiming of a fixture in two orthogonal directions.

BRIEF DESCRIPTION OF THE DRAWINGS

FIGS. 4A-4D are various views of an exemplary embodiment of the invention.

III. DETAILED DESCRIPTION OF EXEMPLARY EMBODIMENTS

A. Overview

For a better understanding of the invention, specific detailed examples of the invention will now be set forth. It is to be understood there are but a few forms the invention can take. Variations obvious to those skilled in the art will be included in the invention and the invention is not limited to these examples.

The context of the exemplary embodiments will be with respect to outdoor sports field lighting of the type illustrated in FIGS. 1A-F and 2A-C. Other analogous types of lighting are possible, including analogous wide area lighting, including indoors.

B. Exemplary Embodiment 1

Figure 1A:
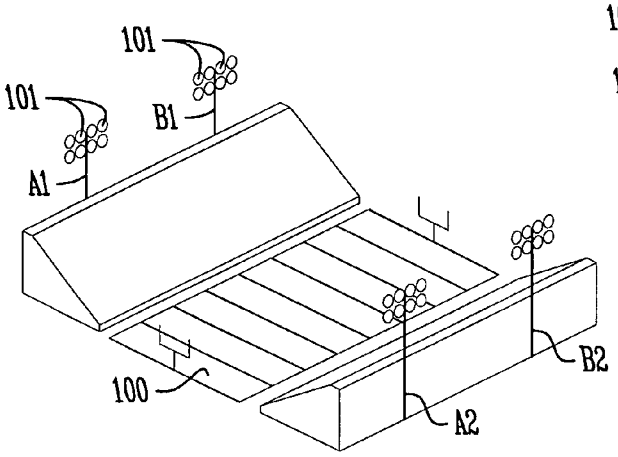
FIGS. 1A-1G are diagrammatic views of an exemplary sports lighting system.
Figure 1B:
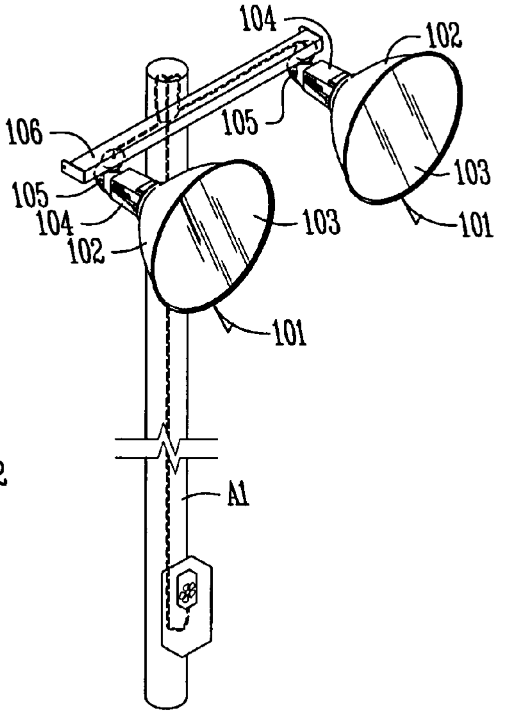
Figure 1C:
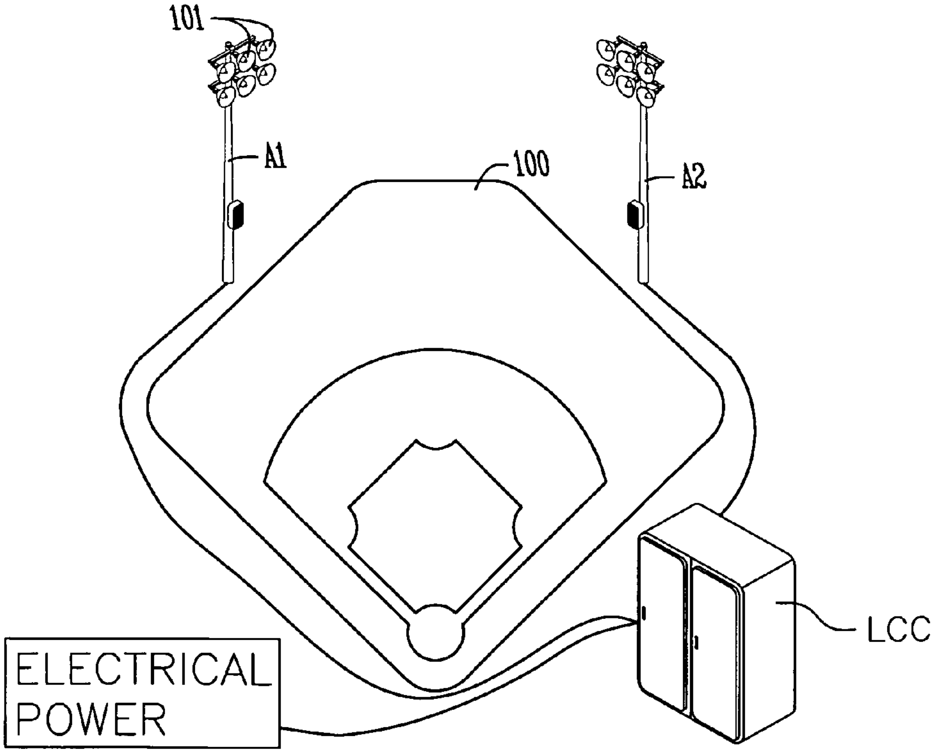
Figure 1D:
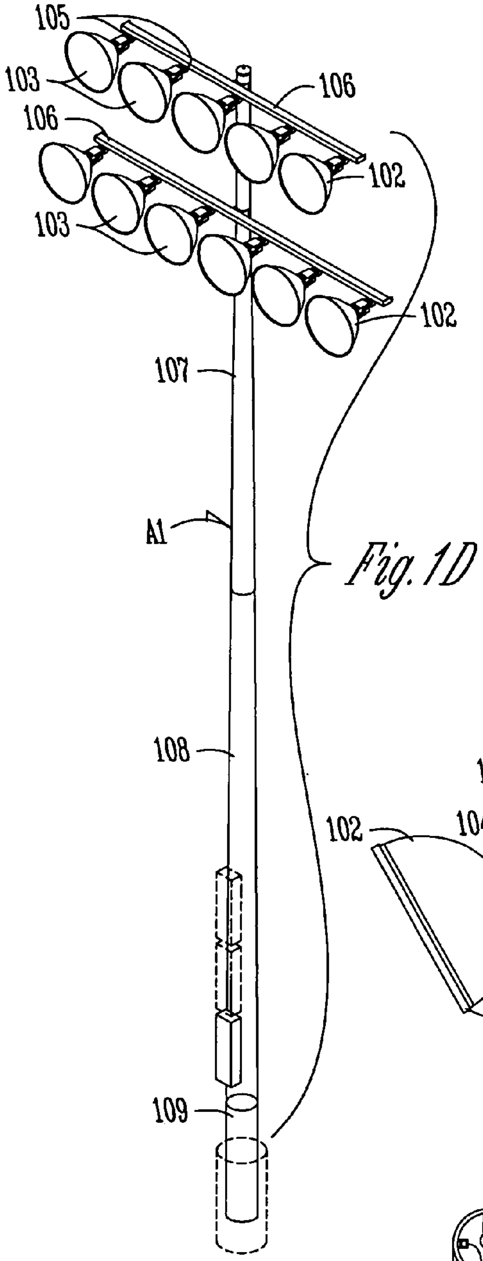
Figure 1G:
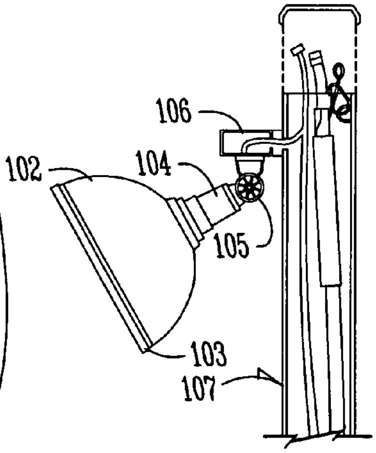
Figure 1E:
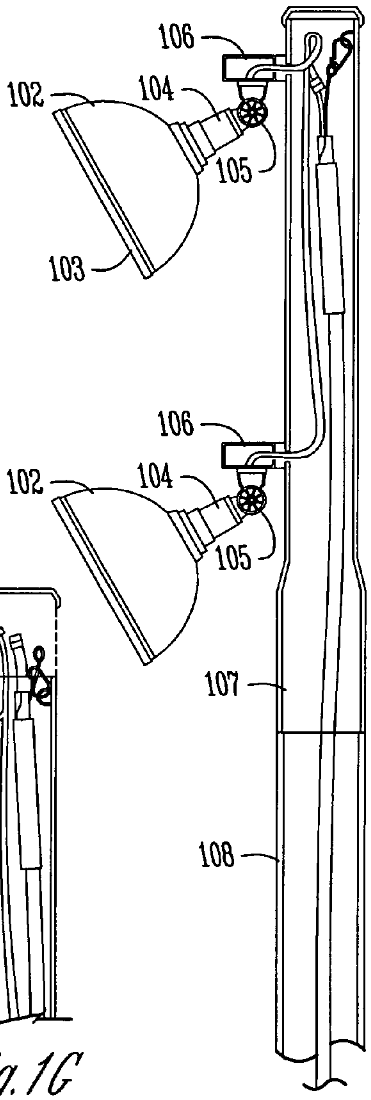
Figure 1F:
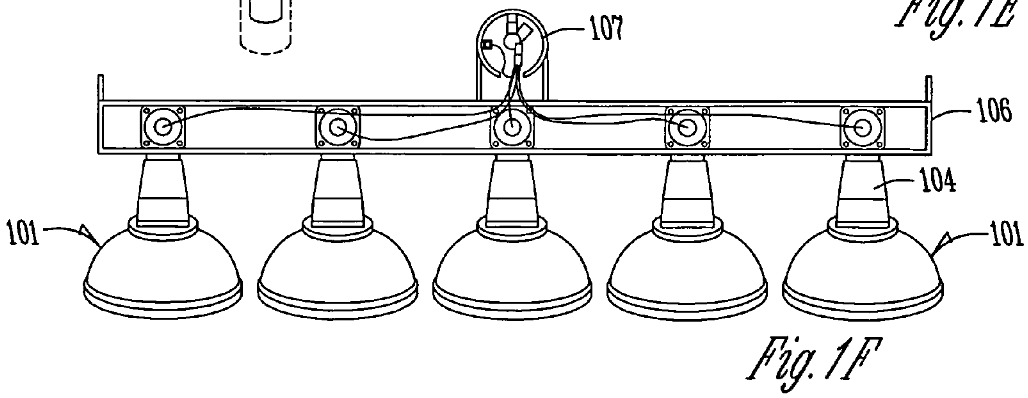
Figure 2A:
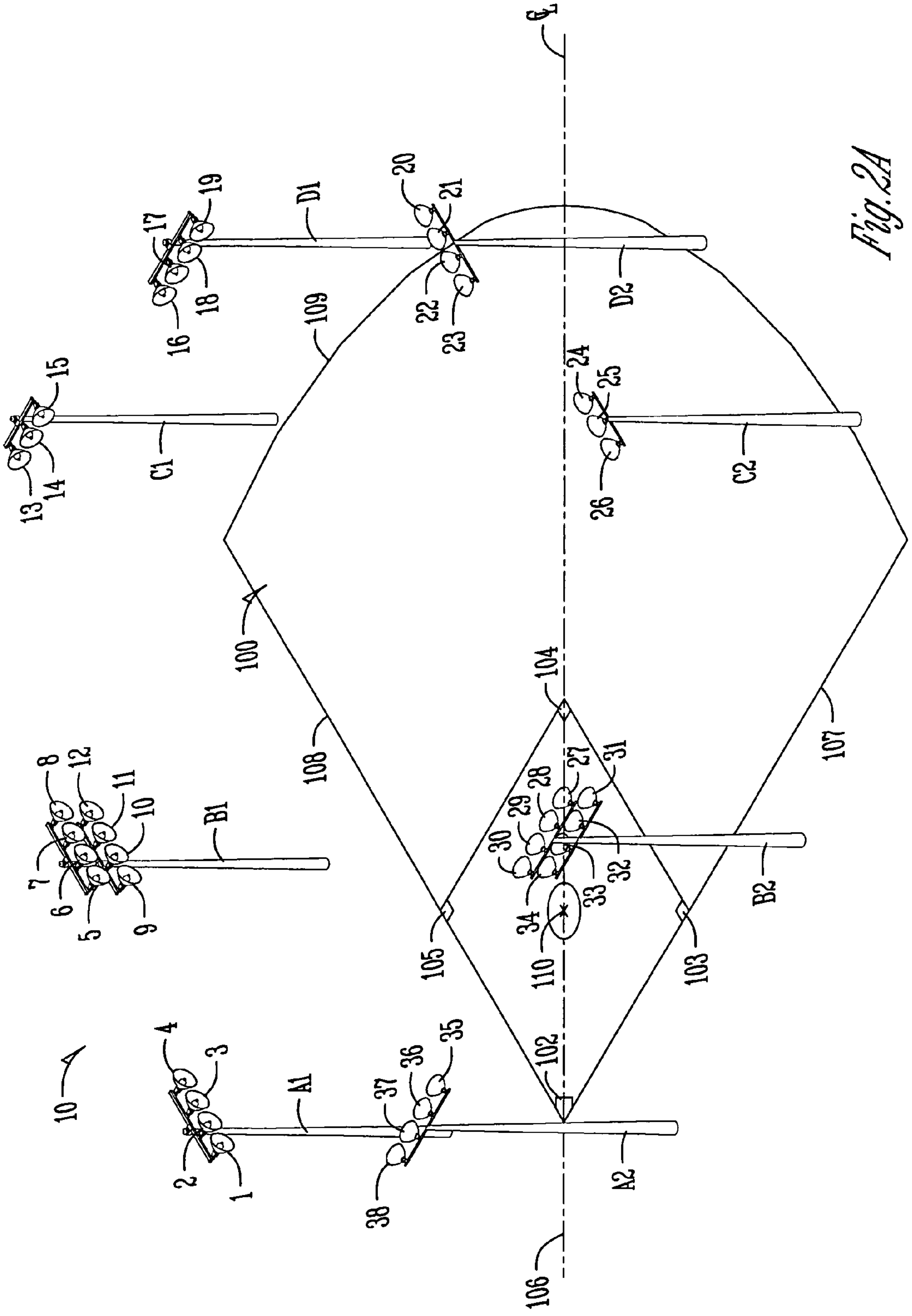
FIGS. 2A-2C are diagrams of a predesigned sports lighting system.
Figure 2B:
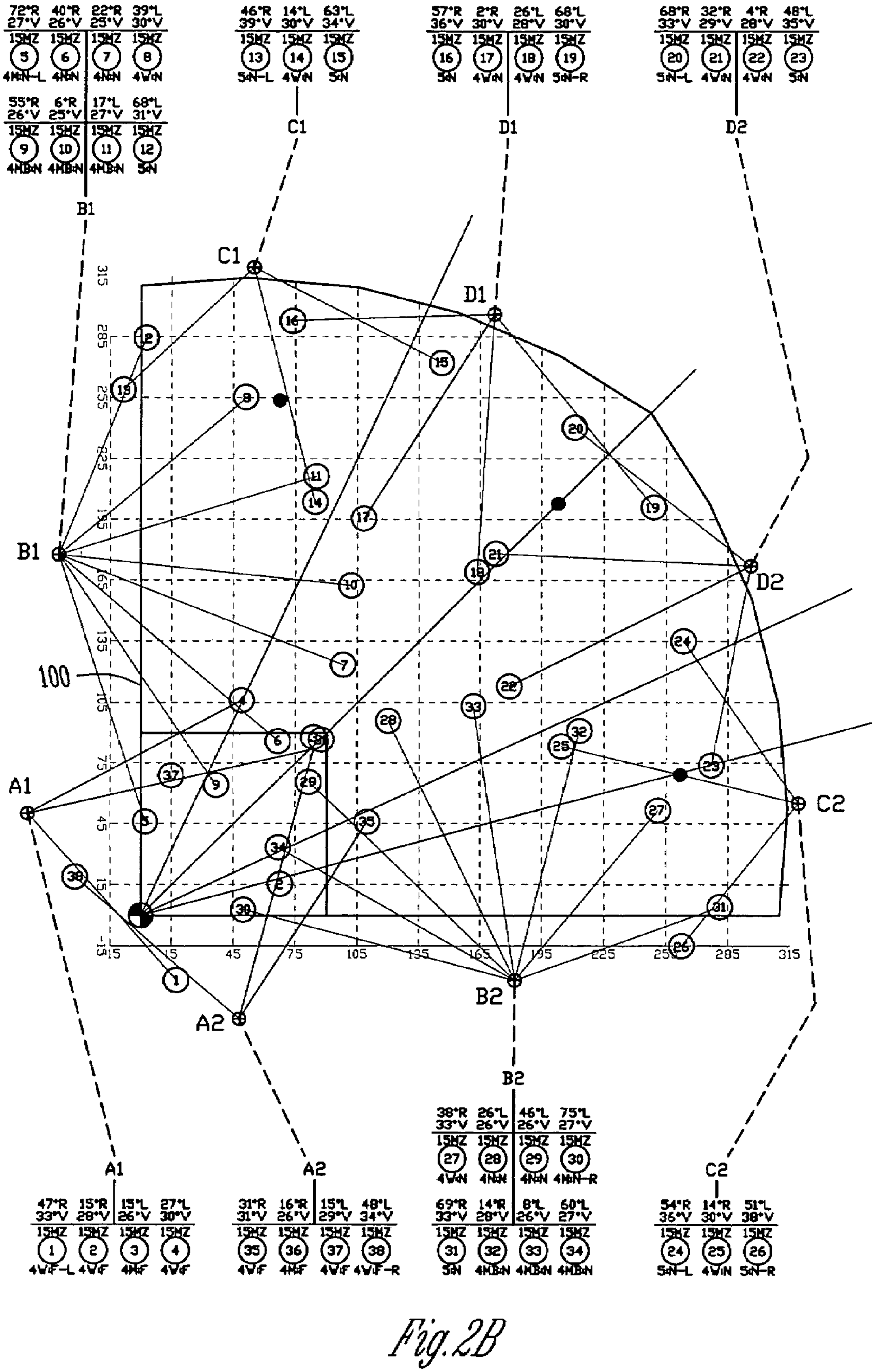
Figure 2C:
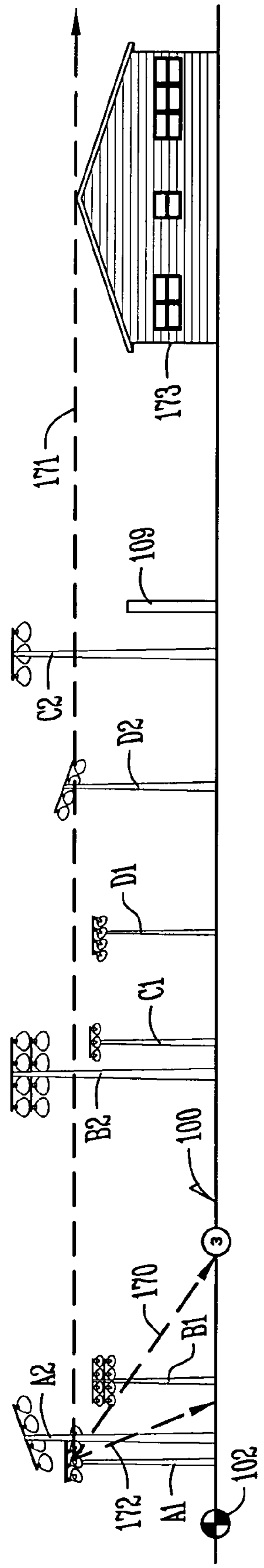

A lighting design is created for a given field 100 that includes known locations of poles, heights of poles, specific beam types and characteristics for plural fixtures on each pole, and aiming points on field 100 to which individual fixtures are aimed (see example of aiming chart of FIG. 2B relative to a baseball field). In the present exemplary embodiment, four poles A1, A2, B1, B2, two on each opposite side of football field 100, are illustrated (see FIG. 1A). The number of fixtures 101 for each pole could vary.

The lighting system utilizes the Musco Corporation LIGHT STRUCTURE™ product. Concrete bases 109 are placed at the designed pole locations on each side of field 100 and are plumbed. Each of the fixtures 101 is factory preset for a pole fitter 107. A tubular steel pole 108 of appropriate height is manufactured or selected according to the design. Each of the bases 109, poles 108, pole fitters 107 (with prewired and preattached fixtures 101 to cross arms 106), is shipped to field 100. At the field (or some time at another location) each of fixtures 101 are angularly adjusted relative to their cross arm in the pre-designed angular orientation called for in the design.

On one of the fixtures 101 for each pole, a laser assembly 120 is mounted (see FIGS. 4A-D). As indicated in the enlarged exploded view at the bottom of FIG. 4A (circle A-A), a metal block 133 has a through-bore 123 in which a commercially available laser pointer 124 can be slideably inserted so that the output lens 127 of laser pointer 124 is approximately flush with the face of block 133.

These relatively inexpensive, battery-powered laser pointers are relatively intense but low power of the red-laser type commonly used in speeches and presentations to point to areas of a projection screen. In this embodiment, the conventional hand-held laser pointer (approx. 2-3 inches long) includes a lens that spreads the collimated or pseudo-collimated laser bean in a plane. In particular, when installed, the laser pointer spread beam is spread in substantially a vertical plane when the pole is erected. As such the beam would intersect along a line across the field from underneath the laser pointer to the other side of the field. By using this slight and inexpensive modification to a cheap laser pointer, a plane of light indicative of the alignment of the pole or fixture(s) is projected across the field. A worker merely has to walk into the plane and perceive the "flash" to recognize the location of the plane of light, even though the worker does not really see the plane of light. This arrangement makes it quicker and easier to "find" the light as opposed to a narrow beam.

Note that the lens to accomplish this plane is well-known. A similar principle is used with laser levels (e.g. Black & Decker BDL 2005 laser level-commercially available). A number of similar types are available off-the-shelf (e.g. straight line laser level from American Tool Co.). They shape laser light into a plane that, when correctly oriented relative a surface, forms a line at the intersection of the plane with the surface.

While a laser level of this type could be used, they are usually much bigger than the pen-sized laser pointer previously described and more costly. A small cheap lens on the end of the pen-sized laser pointer has been found acceptable.

It can be possible, in certain conditions, to actually see the lines across the field (e.g. sometimes at night) but this is not necessary to practice the invention, as will be appreciated.

Block 133 can be bolted through reflector 102 by bolts 129 into threaded bores in block 133. Some play exists between laser pointer 124's body 125 and bore 123. However, when block 133 is mounted to reflector 102, bore 123 is oriented so that it is generally parallel to the aiming axis 110 of fixture 102 (see axis 121 in FIG. 4A). If minor adjustments are needed to align the beam axis of laser 124 to the parallel relationship of line 121 to line 110 in FIG. 4A, adjustment screws 130 can provide some angular adjustment (e.g., 1-3 degrees) for fine adjustment. It is preferable that the plane of light from laser pointer 124 be adjusted to be substantially vertical when the pole is erected. A locking screw 131 can then be turned down to lock laser 124 in position. Again, the goal is to have the beam axis 121 of the collimated light source (laser 124) to be very accurately parallel to the optical axis 110 of reflector 102. Also, by aligning the face of block 133 with the edge of reflector 102, and the lens 127 of laser pointer 124 with the face of block 133, lens 127 is basically perpendicular to optical axis 110 of reflector 102.

Figure 4B:
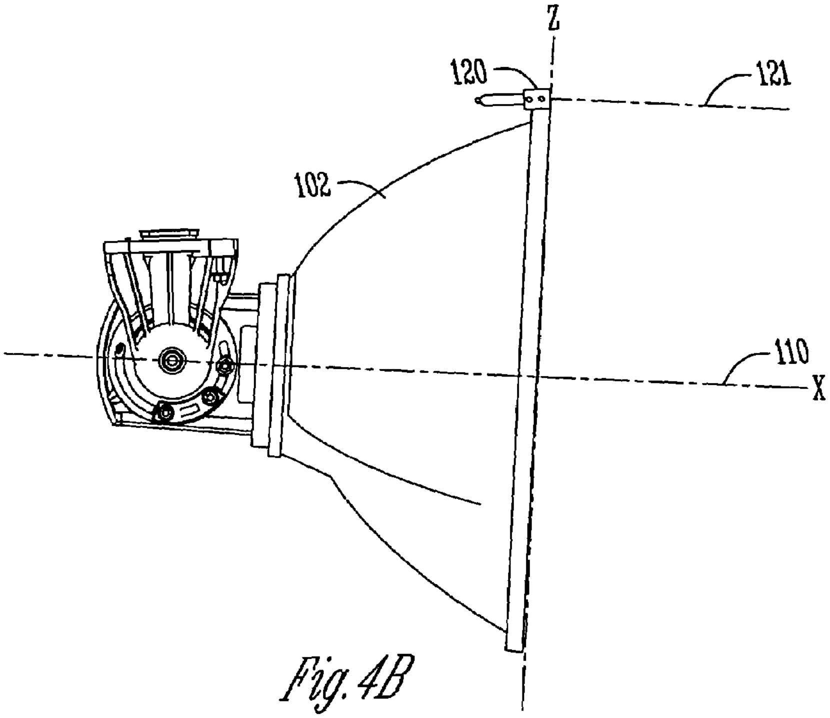
Figure 4C:
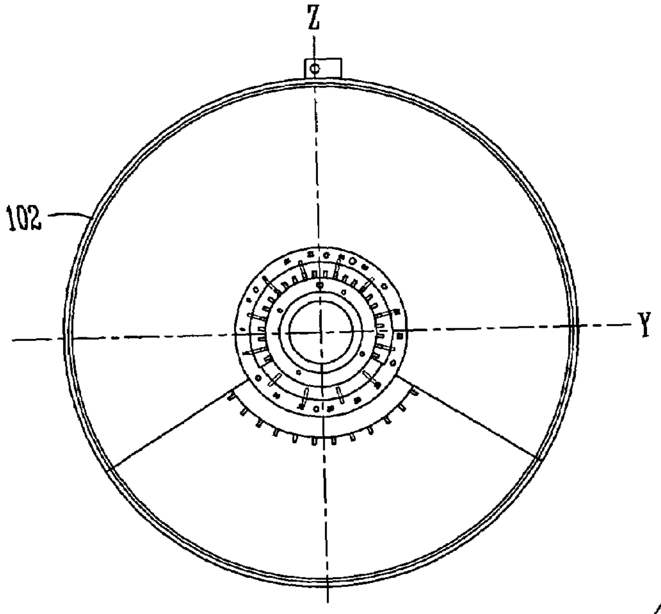
Figure 4D:
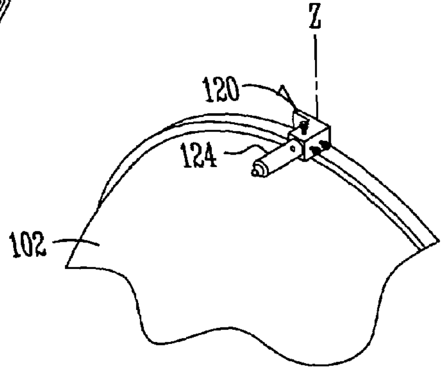
Figure 5:
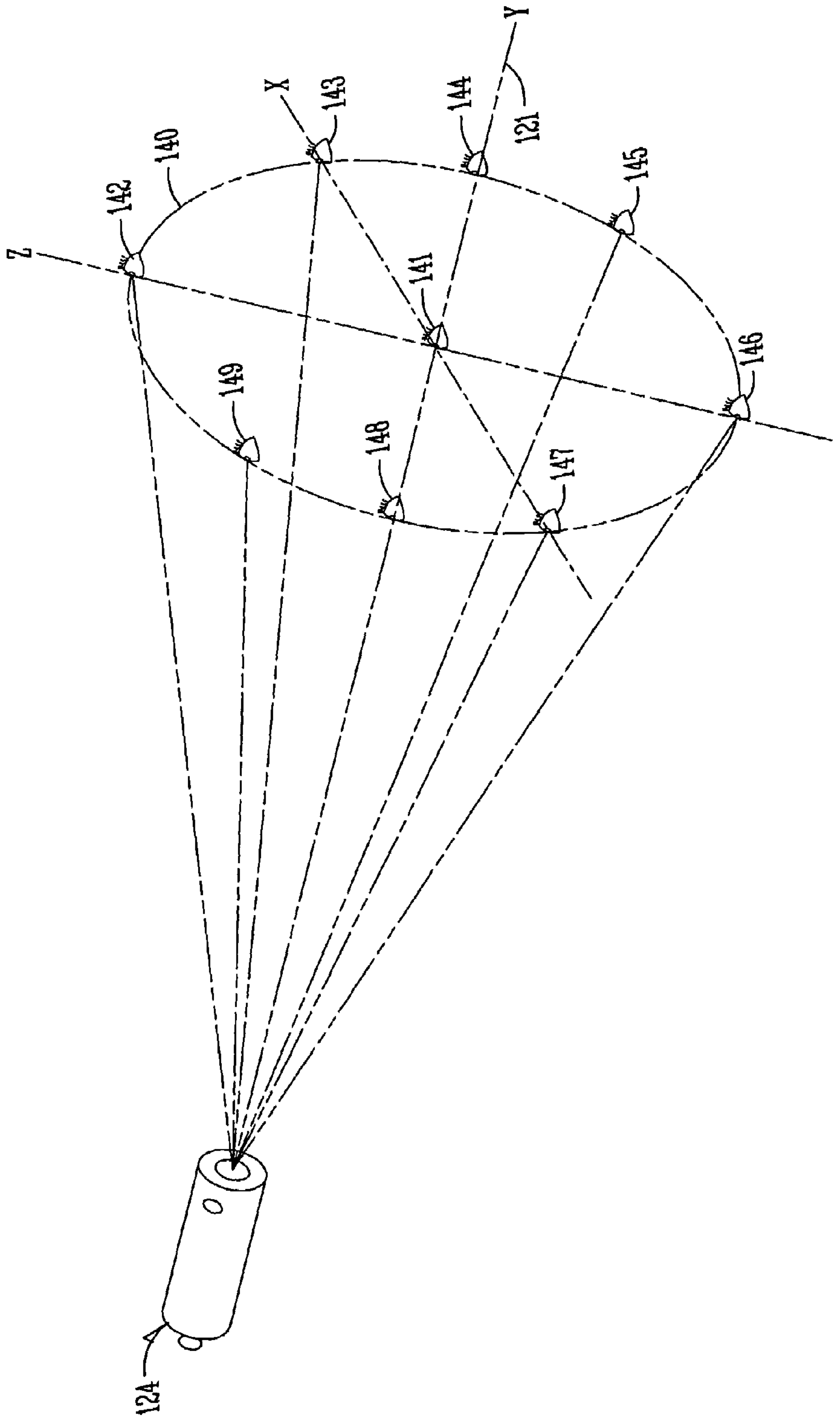
FIG. 5 is a diagram illustrating a principle of the invention.

As illustrated in FIG. 4A, in this embodiment, laser assembly 120 is offset slightly from the vertical axis Z relative to reflector 102. As illustrated in FIG. 4D, the reason is, for the particular reflector 102, a slight offset presents a better mounting position (see Z axis in FIG. 4D is slightly offset from the position of block 122). It could be mounted directly vertically above the fixture axis 110. What is important is that the relationship between the beam axis of laser 124 and the optical axis 110 of reflector 102 is known—here that it is basically a parallel relationship. FIGS. 4B and 4C illustrate this principal.

Preferably, the diode beam issuing from laser 124 is concentric with its case or housing 125. Preferably, the mounting block 122 for laser 124 is in a highly repeatable, accurate surface on reflector 120, or some other point on fixture 101.

The mounting and adjustment components of FIG. 4A are but one way and one location relative to laser assembly 120. For example, reflector 102 could have a special cast or formed receiver for a one-piece laser assembly 120 where the receiver would automatically position the direction of laser beam 121.

FIGS. 3, 5 and 6A-B attempt to illustrate another concept central to this exemplary embodiment. Under certain circumstances, having a laser pointed parallel to the optical axis of a fixture and mounted on the fixture could allow determination if the fixture is correctly aimed to a designated aiming point on the field. Under certain circumstances, the intersection of the laser beam on the field might be discerned. However, the type of laser contemplated does not have sufficient intensity under most circumstances for this to be practical. This is especially true in day time; particularly in sunny conditions. However, the method of this first exemplary embodiment uses a phenomenon illustrated in FIG. 5 to allow the human eye to discern the location of the laser beam even in bright daylight conditions. The phenomenon is perhaps best explained as follows.

Most household flashlights attempt to create a somewhat collimated beam. If one person with the flashlight stands a distance away from another person, and points the center optical axis of the flashlight beam towards but slightly offset from the eyes of the viewing person, even in bright daylight conditions, the person can tell the flashlight is on (they see some light intensity out of the flashlight). But if the person holding the flashlight sweeps the flashlight beam across the viewing person's eyes, when the center of the beam (highest intensity portion) intersects with the viewer's eye, the eye perceives a flash at that instant. Once the high intensity part of the beam moves off the viewer's eyes, that flash is gone.

It has been found this same phenomenon applies with laser pointer 124. Once fixture 101, with laser assembly 120 appropriately mounted on it, is elevated into the air onto a pole and laser 124 is turned on, a viewer of that fixture on the field can walk around the intended aiming point for that fixture. When that viewer's eye moves into the vertical plane of laser beam 121, the viewer will perceive the "flash" and know where laser beam 121 is. The viewer can then determine, within a good level of accuracy, where that fixture is pointing and compare it with the designed aiming point on the field because the plane of laser light (Z-axis in FIG. 5) includes the central aiming axis 121 of the laser. The viewer can then instruct or cause adjustment of the fixture, if needed, to move its aiming direction to the designed aiming point. The viewer would know any offset of the plane of light through laser axis 121 compared to optical aiming axis 110 of the fixture and could literally recheck and confirm the laser beam axis or plane 121 by using the "flash" phenomenon and compare it to the computed aiming point for that fixture on the field to determine any final adjustment for aiming.

As can be appreciated, laser 124 has to have enough intensity to produce that phenomenon, including in a variety of environmental conditions and over a variety of distances. It has been found that even for sunlight and the distances involved with sports lighting, this "flash" phenomenon works with the type of laser pointer described above.

These laser pointers are quite inexpensive (on the order of a couple dollars). Even though the battery would last only for a limited period of time (perhaps 3-5 hours), and may drop in intensity over that period, it should have enough intensity for at least the initial hour of operation, which should usually be enough time to aim a fixture. The laser could, for example, be turned on right before the pole is elevated, giving at least an hour or so to aim the fixture on it.

Therefore, as can be seen relative to the first exemplary embodiment of the invention, a relatively economical, relatively small, battery-powered collimated light source is mounted in a known relationship to the optical axis of the fixture. When preliminarily mounted and aimed, a worker can utilize the phenomenon previously discussed to "find" the laser beam down on the field, even though the worker cannot actually see the path of the laser beam. The worker can then utilize the known relationship of the laser beam to the optical axis of the fixture to confirm or cause the aiming axis to be accurately aimed to its pre-designed aiming point on the field. This method could be used with a laser pointer without a lens which spreads light into a vertical plane. The worker would have to find the optical axis 121 with his/her eye to get the "flash", which might be harder than finding a plane. However this would allow two-dimensional alignment.

It is to be understood that laser beams of these types are at an intensity and of a nature that is not harmful to human eyes, even if directly viewed. It is preferable that the viewer close one eye and use only one eye when trying to see the "flash".

It therefore can further been seen that the method could be applied to individual fixtures. It could also be applied to arrays of fixtures as indicated in the second exemplary embodiment as set forth as follows.

C. Exemplary Embodiment 2

Previously, the Musco Corporation LIGHT STRUCTURE™ system was discussed, including how it allows an array of a plurality of light fixtures to be pre-mounted on a pole fitter at the factory and each fixture's aiming orientation relative to the pole fitter set at the factory. A base 109 for each of the poles has been previously installed in the ground and plumbed. The pole fitter 107 is slip-fit onto the top end of the appropriate pole 108 for each base 109. The combined pole 108 and pole fitter 107, with all of the light fixtures pre-aimed, is then preliminarily slip-fit onto its designated base 109 and ready for final aiming confirmation before pole 108 is seated on base 109.

As previously discussed, this greatly simplifies final aiming because it is assumed base 109 is in the correct position relative to the lighting system design and is plumb; that pole 108 is the correct height; that each of the fixtures on pole fitter 107 have been set to their correct angular orientation relative the pole fitter; that the pole is straight and not leaning; and that the cross arms are straight and perpendicular to the axis of the pole. All that is left is to make sure the pole is in the right rotational position relative its longitudinal axis.

Therefore, based on the assumption that all the parts are correct relative to one another and all that is left is correct rotational position of the pole, the installer only has to check whether one fixture 101 on the pole fitter 107 is accurately aimed to its pre-designated aiming point on field 100. By confirming accurate aiming of one fixture, the assumption is all others are correctly aimed.

Figure 3:
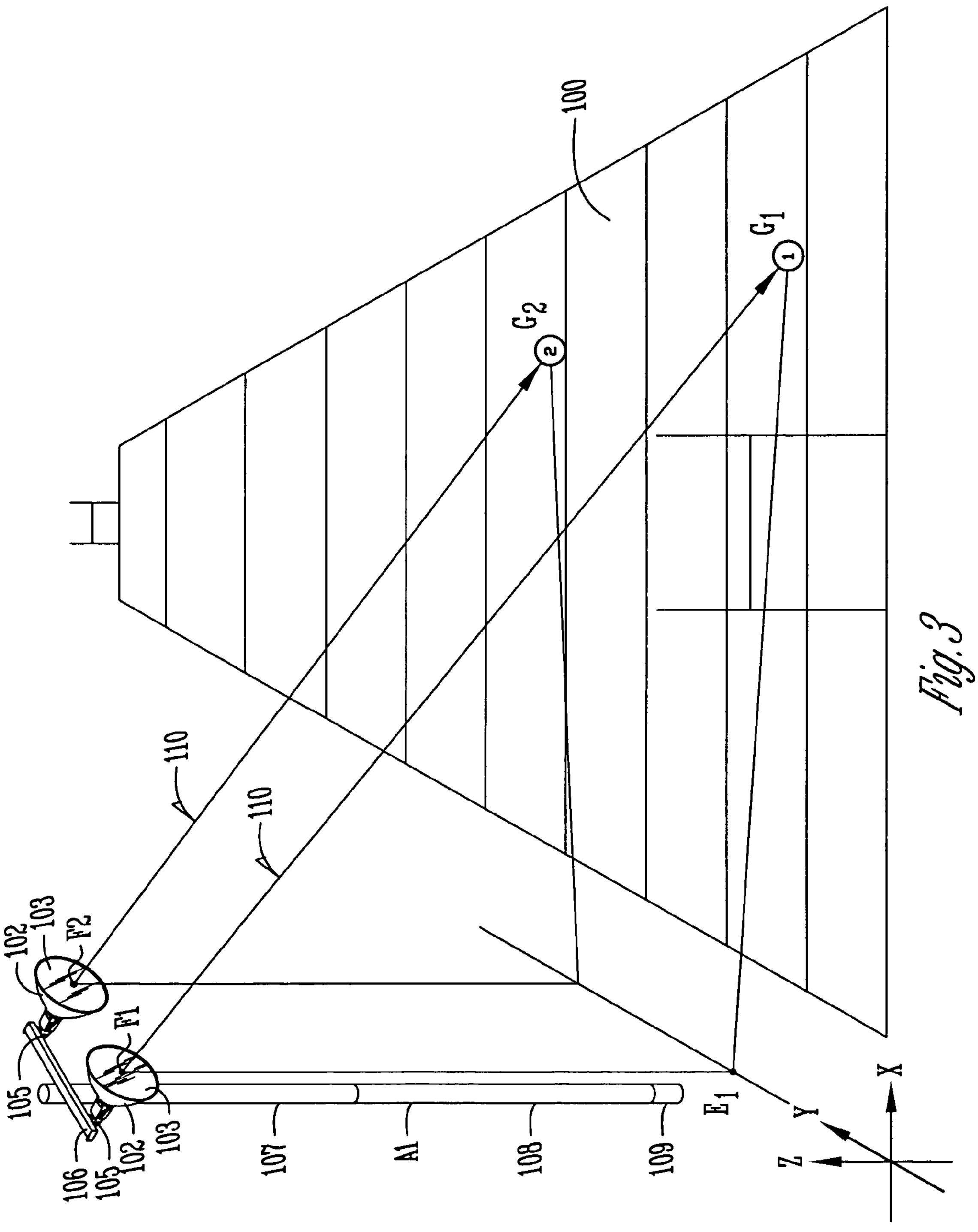
FIG. 3 is a diagram illustrating aiming principles.
Figure 6A:
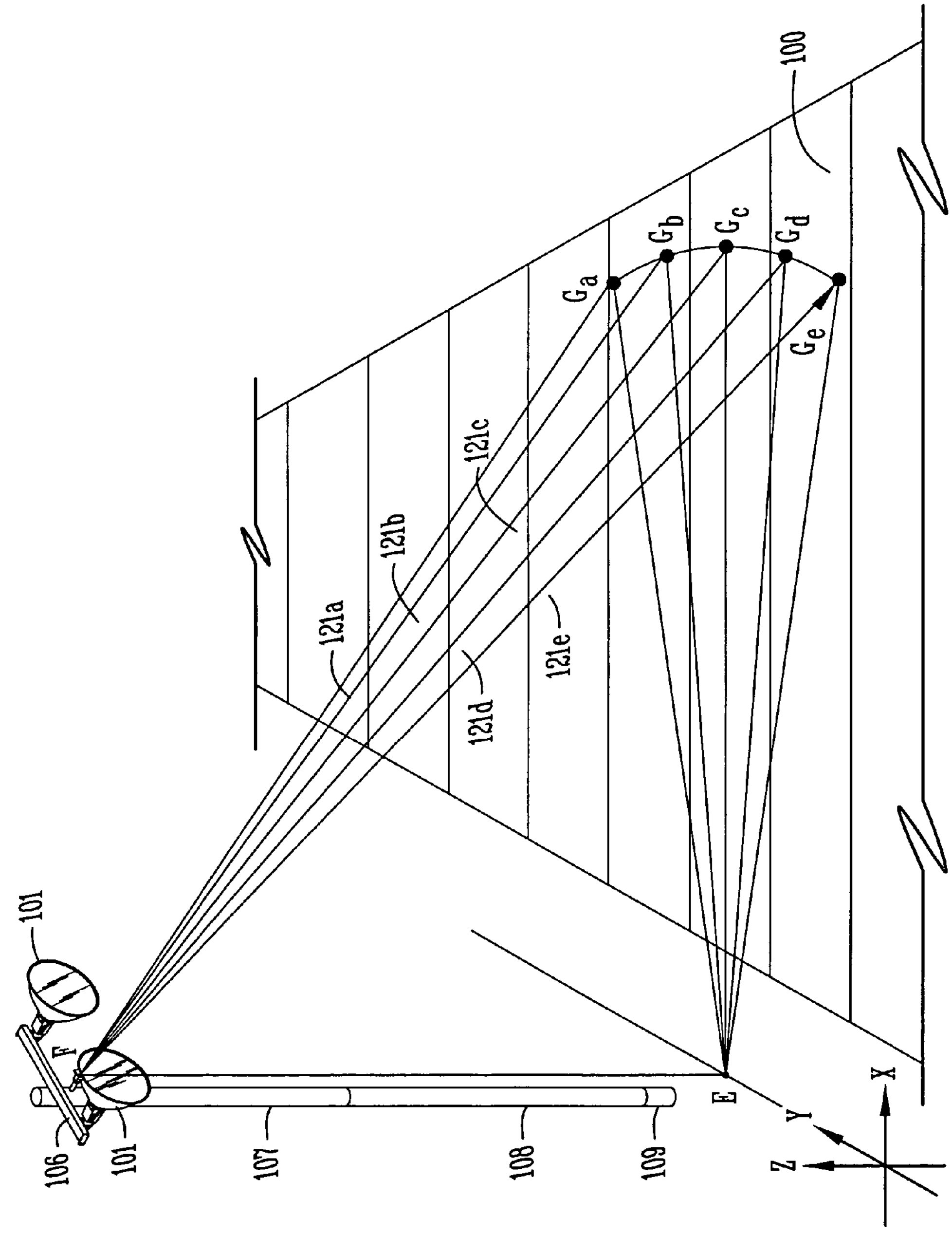
FIGS. 6A and 6B are diagrams illustrating principles of the invention.
Figure 6B:
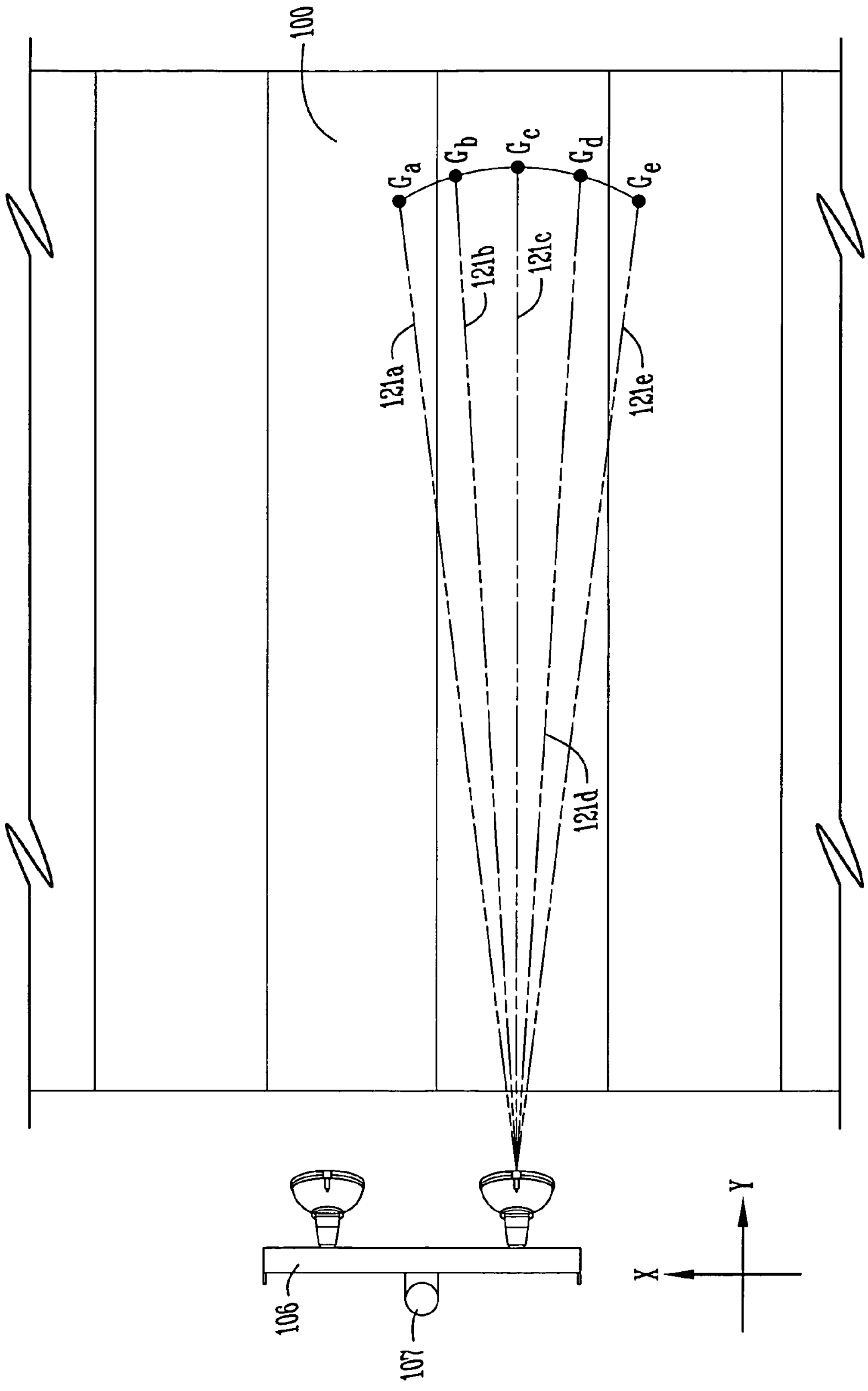

In this second exemplary embodiment, therefore, this installation methodology is followed. As illustrated in FIGS. 3, 6A and 6B, a further efficiency is the following. Because only rotation of pole 108 around a vertical axis is left, the installer only needs to check whether laser beam 121 is in the correct vertical plane. As illustrated in FIG. 3, by just two fixtures for simplicity, a vertical plane defined by points E, F, G includes the aiming point G on the field for that fixture, the intersection of the fixture's optical axis 110 with its lens (point F), and a point E on the ground directly vertically underneath point F. Because there will be no adjustment of the fixture in a vertical plane (it is locked into position), all the installer needs to do is make sure optical axis 110 is in the vertical plane E, F, G to confirm the correct rotational position of pole 108 on base 109. Because laser 124 is parallel to, and basically vertically directly above optical axis 110, as illustrated in FIGS. 6A and B (6A is a perspective view, 6B a top plan view), and its beam 121 is spread in a vertical plane, a worker would likely begin by standing on the aiming point for the fixture on field 100 (see the position $G_{C)}$ and look for the "flash" of the laser beam 121. If the worker sees the "flash", this confirms the predesigned aiming point for the fixture is in the vertical plane E, F, G and pole 108 is in a correct rotational position. The worker can then instruct or cause pole 108 to be seated for final installation.

However, if the worker does not see the "flash", the worker can move laterally in either direction from aiming point $G_C$. If, for example, the worker sees the "flash" at $G_B$, the worker knows the pole needs to get rotated clockwise a commensurate amount to bring plane E, F, G into alignment with point $G_C$. If the worker moves all the way to point $G_A$ away from $G_C$ before the flash is perceived, pole 108 must be rotated even further clockwise. The worker only has to walk into the vertical plane of the laser, perceive the "flash", and know how far off the alignment is. Conversely, if the flash is perceived at points $G_D$ or $G_E$, pole 108 must be rotated counter-clockwise to line up plane E, F, G with point $G_C$.

Of course, FIGS. 6A and B show only a few points G over a limited range away from design point $G_C$. This is for illustration purposes only. Normally, installation procedures are accurate enough that the preliminary rotation of pole 108 will be within a reasonable range from its intended rotation.

The second exemplary embodiment, in essence, requires only one laser assembly 120, for a couple of dollars, on one fixture 101. The laser would only be used to confirm correct rotational position of pole 108 and then would no longer be needed. Its relatively small size and profile would not substantially affect wind load or weight, or any other performance of the lighting system. The materials can be made of non-corroding metals but would be durable enough that they would remain intact over the normal lifespan of such systems, including in high winds and other elements experienced outside.

D. Exemplary Embodiment 3

The second exemplary embodiment likely would utilize one worker at the aiming point on the field and one worker controlling any needed rotation of the pole. These tasks could be combined into one worker, as set forth in the following embodiment.

Figure 7:
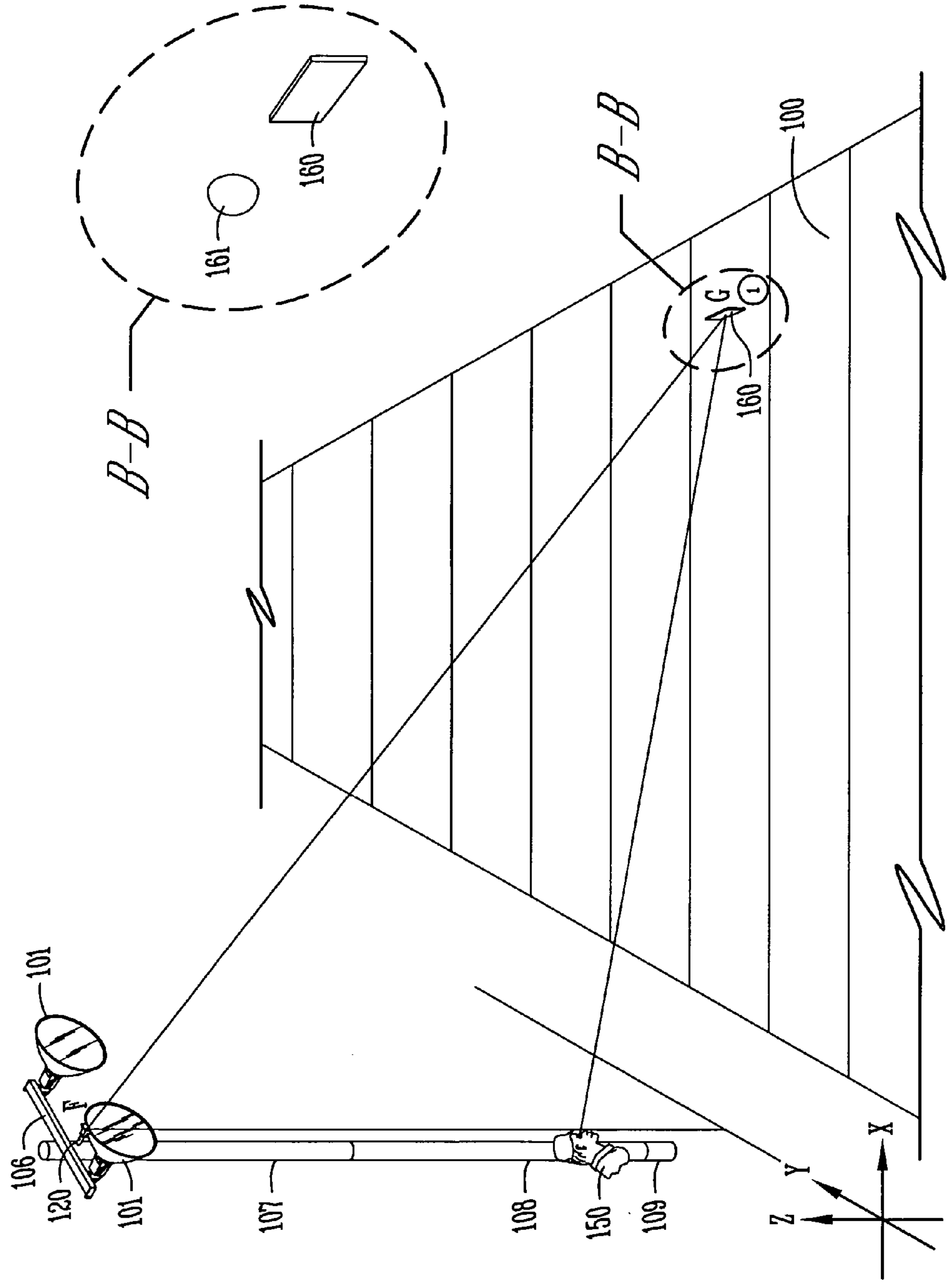
FIG. 7 is an alternative embodiment of the invention.

By referring to FIG. 7, just one worker 150 could stand directly underneath fixture 101 with laser assembly 120 and be in control of a machine that could rotate pole 108. A mirror 160 could be placed at the designated aiming location on field 100 for that fixture 101 with laser 120. Mirror 160 needs to be oriented relative to the eye of worker 150 so that the worker can see the image of fixture 101 with laser 120. The worker would then move his or her head to see if the "flash" phenomenon is perceived. If not, the worker could rotate pole 108 until plane E, F, G does produce the "flash" phenomenon, at which point rotation would stop and worker 150 assumes the correct rotational position of pole 108 is achieved. The worker would then cause pole 108 to be seated on base 109. Because the laser if projecting in a vertical plane across the field, the worker just has to move laterally until the flash is perceived.

As illustrated at the top of FIG. 7, mirror 160 could be a flat mirror. Flat mirrors tend to provide a better sensitivity to flash phenomenon. However, other shaped mirrors could be used, particularly a convex or spherical mirror 161. They tend to be less sensitive but would allow view of fixture 101 over a wider range.

Instead of the worker rotating pole 108 to get it aligned, the worker could move from position in plane E, F, G to one side or the other to see how far off rotational alignment might be and then rotate pole 108 accordingly. A spherical mirror would allow a longer range of lateral movement of worker 150 while still being able to keep the image of fixture 101 in view in the mirror.

Figure 8:
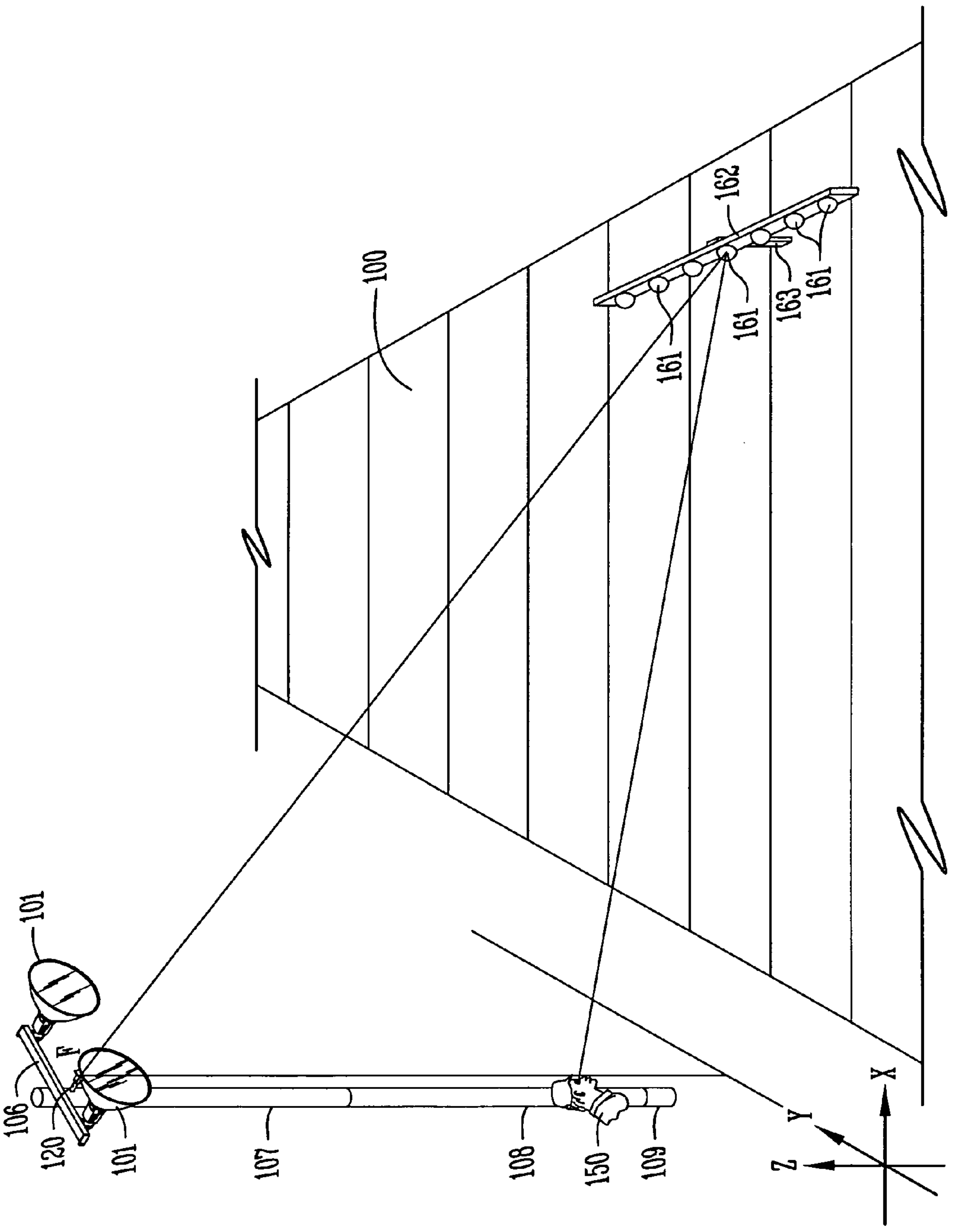
FIG. 8 is an alternative embodiment of the invention.

FIG. 8 shows an alternative embodiment for mirror 161. By reference also to FIGS. 9A-G, a bar or elongated member 162 could have a plurality of spherical mirrors 161 attached at spaced apart locations. A center stake 163 would allow the combination to be temporarily staked in the ground at the aiming point on field 100. As illustrated in FIG. 8, worker 150 could simply stay stationary and scan his/her eyes along the mirrors on bar 162 to see if the flash phenomenon is perceived. Depending on which mirror 161 this occurs, the worker will know whether rotational alignment of pole 108 is correct (or whether it needs adjustment). In other words, if the "flash" occurs at the mirror just above the correct aiming point on the field, this confirms the fixture aiming is in the correct vertical plane and no pole rotation is needed. If the "flash" is perceived in the mirror on one end of bar 162, the worker knows the vertical plane of the fixture aiming axis is offset that amount relative to the correct aiming point on the field. The worker can then rotate pole 108 and watch for the flash phenomenon coming closer and closer to the mirror 161 at the intersection of bar 162 and stake 163, and when the flash phenomenon is seen at that middle mirror, confirmation of correct rotation, and thus assumption of correct aiming alignment for the whole array is achieved.

Figure 9A:
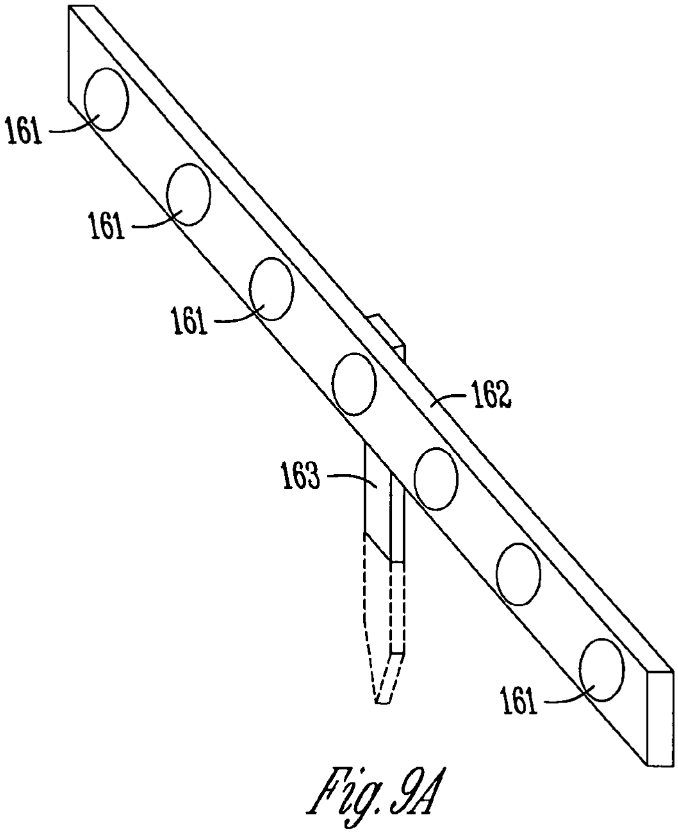
FIGS. 9A-9H are isolated views from FIG. 8.
Figure 9C:
Figure 9F:
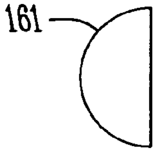
Figure 9B:
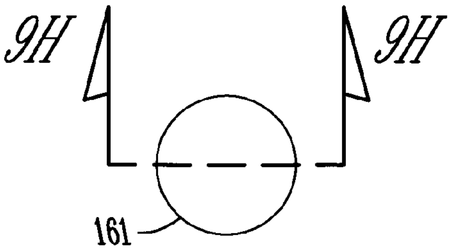
Figure 9D:
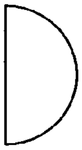
Figure 9G:
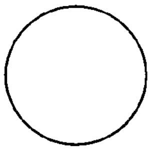
Figure 9E:
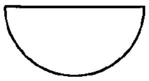
Figure 9H:
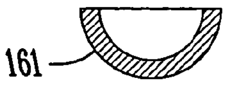

Bar 162 and stake 163 could be made from wood two-by-fours, and nailed, screwed, or bolted together. Mirrors 161 can be small plastic spherical mirrors that are glued or otherwise secured to bar 162. FIG. 9A illustrates one example of spacing between mirrors 161 and one example of relative dimensions for the components. Variations are, of course, possible, including having mirrors 161 in abutment (side-by-side) all along bar 162. The tool of FIG. 9A could be relatively economically created. Again, it allows one worker 150 to both check if the vertical plane E, F, G is correctly aligned and be at or near the pole to cause it to be rotated, if needed, to the correct position.

Figure 10:
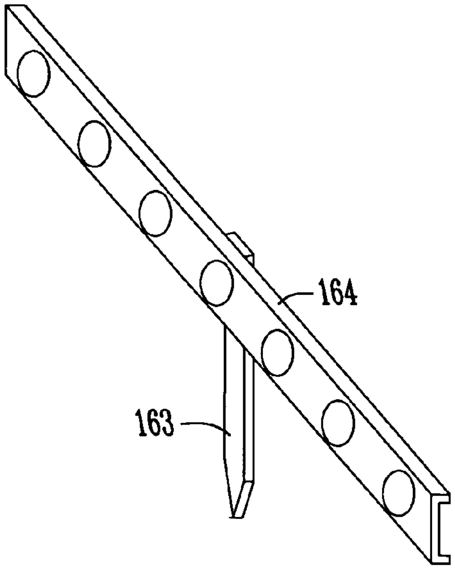
FIGS. 10-13 are alternative embodiments of the invention.

FIG. 10 shows an alternative embodiment for the tool of FIG. 9A. A one piece plastic molded member 163/164 can be initially made with spherical bumps. Through well known methods, at least the spherical molded bumps could be coated with a mirror finish.

Figure 11:
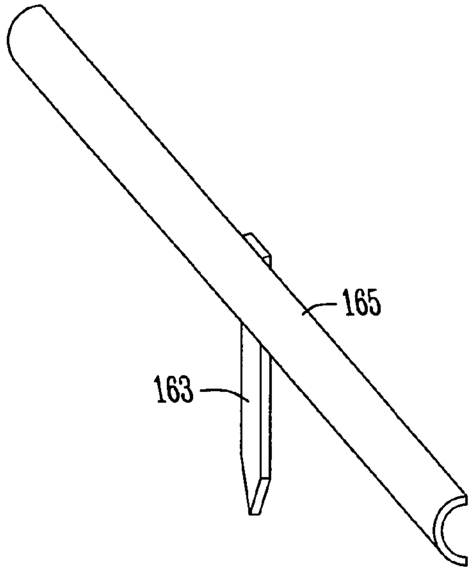
Figure 12:
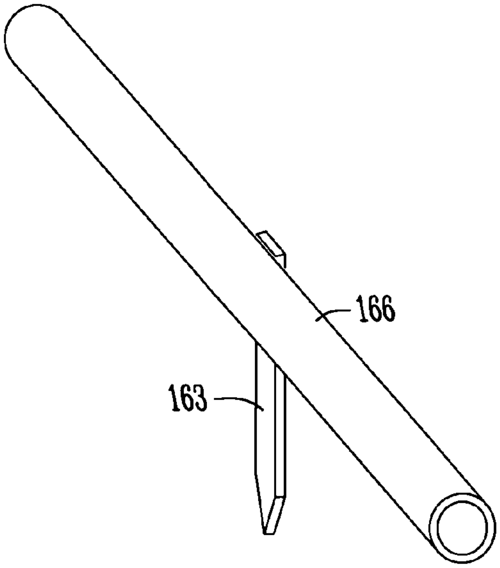

FIGS. 11 and 12 illustrate other alternatives. A trough-shaped member 165 (FIG. 11) could have a mirror outer finish and be molded of plastic, or made out of relatively inexpensive metal with a mirror outer finish or surface. Alternatively, even a tubular member 166 (FIG. 12) of those characteristics could be used.

The processes to coat plastic with a mirror finish are like those used to create plastic car headlight reflectors. There are sputtering processes, vacuum chamber coating processes, and other known processes to do so.

Figure 13:
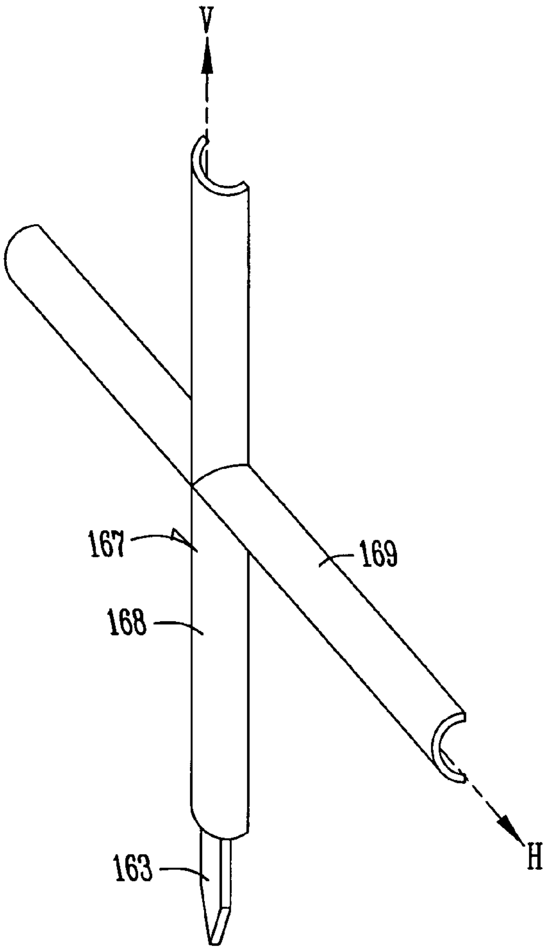

FIG. 13 illustrates one further alternative. If not only horizontal position but vertical aiming position of a fixture is desirable, a cross shape (FIG. 13), having a horizontal arm 169 and a vertical arm 167, could be created and staked in the ground. This would allow worker 150 at the location of the pole to view the flash phenomenon both horizontally and vertically and adjust to get alignment of the fixture in two planes.

E. Options and Alternatives

It will be appreciated that the invention can take many forms and embodiments. Variations obvious to those skilled in the art will be included within the invention. Same examples are discussed above. Just a few other examples of options and alternatives will be discussed below.

Specific structures, components, and materials used can vary.

Collimated light assembly 120 can be built as one unit and eventually be bolted on as one unit. Reflector 102 can be formed in a manner to provide a good, secure mounting.

The invention does also contemplate literally just looking for the "dot" or "light" of the laser beam on the field to see how close to the aiming point the fixture is (instead of trying to perceive the "flash" phenomenon). However, as previously described, this may not work except at night it would still be hard to do. Finding the dot in, for example dark green grass, would be difficult.

The placement of the laser assembly could vary. Also, in embodiments such as embodiment 2, alignment could be relative to a fixture, the pole, a cross arm, or other points of reference. On the other hand, as mentioned, the system could be used for more than one fixture on each pole or, stated differently, for any fixture desired.

The invention is applicable to other applications besides outdoors sports lighting. One example of the need for this might be in an arena setting where each fixture must be individually aimed when installed. There could be some type of jig or removable collimated light source component that could be placed on each fixture as it is being aimed and then removed and moved to the next fixture, or, for the relatively inexpensive cost, these could be assembled on each fixture. In some arenas, there are spotlights that need precise aiming. This would be done individually.

While lasers have been discussed, other collimated or pseudo-collimated light sources would work.

The methodology can be used in other situations and not just in the initial installation of a lighting system. For example, if aiming of lights needs to be reset, this methodology and system could be used to confirm correct re-aiming. There are situations where poles of existing systems must be moved (for example, for renovation or new construction). A computer or other methods would redesign aiming points and the present invention could be used to reconfirm the new aiming angles.

This system can also be useful for lighting systems where it is not possible to pre-aim the fixtures at the factory or, for example, where cross arms must be bolted onto the pole and therefore there is no accuracy that can be assumed between cross arms and pole.

It can therefore be seen that the invention meets at least all of its stated objectives. It has been found that the invention allows improved accuracy in a variety of conditions. Even embodiment 2 has been found to make it easier to meet accuracy of plus or minus 1 degree from the designed aiming point (this is many times in the range of approximately 1 or 2 feet) which can be acceptable for many applications. However, as can be appreciated, the invention also promotes efficiency and economy.

What is claimed is:

1. A method of determining aiming direction of a lighting fixture which is configured to produce a relatively controlled, concentrated light beam along the aiming direction of the lighting fixture comprising:

a. projecting a substantially collimated light source in a known relationship to the aiming direction of the lighting fixture;

b. finding the substantially collimated light source at a position away from the fixture;

c. deriving the aiming direction of the lighting fixture by the known relationship of the substantially collimated light source with the aiming direction of the lighting fixture.

2. The method of claim 1 further comprising placing the lighting fixture in a provisional operating position and orientation relative to an aiming point at a target area and following steps a-c of claim 1 to determine whether the aiming direction of the lighting fixture is within an acceptable margin of error to the aiming point at the target area.

3. The method of claim 2 wherein the step of finding the substantially collimated light source comprises detecting the intersection of at least a part of the collimated light source with the target area.

4. The method of claim 2 wherein the step of finding the substantially collimated light source comprises viewing directly, or in a reflective surface, the collimated light source and the lighting fixture and moving to seek a flash of intensity indicative of the substantially collimated beam.

5. The method of claim 4 further comprising comparing location of where the flash of intensity is perceived relative to the aiming point at the target area to determine any offset between the two.

6. The method of claim 5 further comprising adjusting the aiming direction of the lighting fixture if needed.

7. The method of claim 1 wherein the collimated light source comprises a laser.

8. An apparatus for aiming a lighting fixture relative to a target, comprising:

a. a lighting fixture having an optical aiming axis;

b. a collimated light source positioned on the fixture having a beam axis directed in generally the same direction as the optical axis of the fixture; and c. one or more mirrors in combination with a carrier that is elongated in at least one direction, the one or more mirrors being placeable at or near an aiming location at the target and adapted to provide a viewer an image of the fixture and collimated light source at and around the aiming location at the target.

9. The apparatus of claim 8 wherein the lighting fixture is one of a plurality of lighting fixtures mounted on one or more cross arms and of known relationship to one another.

10. The apparatus of claim 9 further comprising positioning the collimated light source on at least one additional lighting fixture of the plurality of lighting fixtures.

11. A method of aiming lighting fixtures comprising:

a. placing a light source with a substantially collimated light beam having a central intensity axis in a known position on a lighting fixture having an aiming axis to be aimed, the known position comprising a known relationship between the central intensity axis of the collimated light beam and the aiming axis of the lighting fixture;

b. preliminarily installing the lighting fixture in predesigned position and orientation relative to a target area;

c. viewing directly, or in a reflective surface, the substantially collimated light beam and lighting fixture at a known location relative to a predetermined aiming point at the target area;

d. moving while maintaining view of the collimated light beam and fixture to seek a flash of intensity indicative of the central intensity axis of the collimated light beam;

e. comparing location of flash phenomenon at the target area relative to the aiming point at target area;

f. adjusting the lighting fixture, if needed.

12. The method of claim 11 further comprising spreading the collimated light beam in at least one plane.

13. The method of claim 11 further comprising spreading the collimated light beam in two planes.

14. The method of claim 13 further comprising moving to seek the flash of intensity form the collimated light beam to aim the fixture in two planes relative the target.

15. A method for aiming an array of lighting fixtures, comprising:

a. pre-designing a lighting system for a target area including pole locations, number of fixtures, and aiming points for each fixture to the target area;

b. installing bases in plumbed orientation at the pole locations;

c. manufacturing a pole fitter with cross arms having a known geometrical relationship to one another;

d. manufacturing a pole to which the pole fitter is installed and having a lower end which is slipfittable onto a base;

e. pre-installing and pre-aiming a plurality of fixtures each having an optical axis on the pole fitter;

f. installing the pole fitter onto the pole;

g. preliminarily installing the pole on the base;

h. mounting a collimated light source having a beam axis on one of the fixtures on the pole fitter wherein the beam axis of the collimated light source is parallel to the optical axis of the fixture to which it is attached;

i. operating the collimated light source when the pole and the pole fitter are preliminarily mounted on the base and roughly orientating the rotational position of the pole to try to match aiming points at the target area for fixtures on the pole;

j. either (a) standing at or near an aiming point for the fixture with a collimated light source at the target area, or (b) placing an elongated mirror or plurality of mirrors at and around the aiming point;

k. either moving relative the aiming point or viewing the mirror or plurality of mirrors to perceive a flash phenomenon indicating intersection of the beam axis of the collimated light source with an eye;

l. determining whether any rotational adjustment of the pole is required to align aiming of the array of fixtures.

16. A method of aiming lighting fixtures comprising:

a. placing a substantially collimated light source beam spread into a plane and having a central intensity axis in a known position on a lighting fixture to be aimed, the known position comprising a known relationship between the plane of the collimated light source beam and the aiming axis of the lighting fixture;

b. preliminarily installing the lighting fixture in predesigned position and orientation to a target area;

c. viewing directly, or in a reflective surface, the collimated light source beam and light fixture at a known location relative to a predetermined aiming point at the target area;

d. moving while maintaining view of the collimated light source and lighting fixture to seek a flash phenomenon of intensity indicative of the central intensity axis of the collimated light source beam;

e. comparing location of the flash phenomenon relative to the aiming point at target;

f. adjusting the lighting fixture, if needed.

17. A method for aiming an array of sports lighting fixtures, comprising:

a. pre-designing a lighting system for a sports field including pole locations, number of fixtures, and aiming points for each fixture to the field;

b. installing bases in plumbed orientation at the pole locations;

c. manufacturing a pole fitter with cross arms having a known geometrical relationship to one another;

d. manufacturing a pole to which the pole fitter is installed and having a lower end which is slipfittable onto a base;

e. pre-installing and pre-aiming a plurality of fixtures each having an optical axis on the pole fitter;

f. installing the pole fitter onto the pole;

g. preliminarily installing the pole on the base;

h. mounting a collimated light source having a beam axis on one of the fixtures on the pole fitter where the beam axis of the collimated light source is parallel to the optical axis of the fixture to which it is attached and the collimated light source is spread into a plane;

i. operating the collimated light source when the pole and the pole fitters are preliminarily mounted on the base and roughly orientating the rotational position of the pole to try to match aiming points on the field for fixtures on the pole;

j. either (a) standing at or near the aiming point for the fixture with a collimated light source on the field, or (b) placing an elongated mirror or plurality of mirrors at and around the aiming point on the field;

k. either moving relative the aiming point or viewing the mirror or plurality of mirrors to perceive a flash phenomenon indicating intersection of the beam axis of the collimated light source with an eye;

l. determining whether any rotational adjustment of the pole is required to align aiming of the array of fixtures.

18. The method of claim 15 wherein the collimated light source comprises a laser.

19. The method of claim 16 wherein the collimated light source comprises a laser.

20. The method of claim 17 wherein the collimated light source comprises a laser.

* * * * *